US006543781B1

United States Patent
Rehm et al.

(10) Patent No.: US 6,543,781 B1
(45) Date of Patent: Apr. 8, 2003

(54) SPINDLE-DRIVE MOTOR WITH A MAGNETIC FLUID SEAL

(75) Inventors: Thilo Rehm, Villingen-Schwenningen (DE); Jörg Hoffmann, Mettlach (DE)

(73) Assignee: Precision Motors Deutsche Minebea GmbH, Villingen-Schwenningen (DE)

( * ) Notice: Subject to any disclaimer, the term of this patent is extended or adjusted under 35 U.S.C. 154(b) by 69 days.

(21) Appl. No.: 09/676,543

(22) Filed: Sep. 29, 2000

(30) Foreign Application Priority Data

Sep. 30, 1999 (DE) .......................... 199 47 217

(51) Int. Cl.[7] ................................ F16J 15/43
(52) U.S. Cl. ....................................... 277/410
(58) Field of Search ......................... 277/410

(56) References Cited

U.S. PATENT DOCUMENTS

| | | | | | |
|---|---|---|---|---|---|
| 2,883,212 A | * | 4/1959 | Laser | ............. | 277/410 |
| 4,200,296 A | * | 4/1980 | Stahl et al. | ............. | 277/302 |
| 4,526,381 A | * | 7/1985 | Ezekiel | ............. | 277/410 |
| 4,527,802 A | * | 7/1985 | Wilcock et al. | ............. | 277/302 |
| 4,565,379 A | * | 1/1986 | Ballhaus | ............. | 277/410 |
| 4,694,213 A | | 9/1987 | Gowda et al. | | |
| 4,817,964 A | | 4/1989 | Black, Jr. | | |
| 5,051,853 A | * | 9/1991 | Hosoya | ............. | 277/347 |
| 5,152,539 A | * | 10/1992 | Takii et al. | ............. | 277/347 |
| 5,161,902 A | * | 11/1992 | Fujii | ............. | 277/410 |
| 5,572,078 A | | 11/1996 | Saichi et al. | | |
| 5,617,272 A | | 4/1997 | MacLeod et al. | | |
| 5,821,646 A | | 10/1998 | Chuta et al. | | |
| 6,102,575 A | * | 8/2000 | Obara | ............. | 384/480 |
| 6,181,513 B1 | * | 1/2001 | Obara | ............. | 360/99.08 |
| 6,290,233 B1 | * | 9/2001 | Yamamura et al. | ......... | 277/410 |

FOREIGN PATENT DOCUMENTS

| | | |
|---|---|---|
| DE | 3828081 | 11/1989 |
| EP | 0910080 | 4/1999 |

\* cited by examiner

*Primary Examiner*—Anthony Knight
*Assistant Examiner*—William Hutton
(74) *Attorney, Agent, or Firm*—The Maxham Firm

(57) ABSTRACT

A spindle-drive motor for hard drives having a baseplate, a shaft and one or more bearings for rotational mounting of a rotationally driven rotor, with at least one magnetic fluid seal arranged between the stationary part and the rotating part of the spindle-drive motor. The seal is formed of an upper and a lower yoke lamination and a magnet disk arranged between the yoke laminations, where a concentric chamber is formed so that it is open toward the inside on one side to hold a magnetically conducting fluid. A flux concentrating lamination extends into this chamber. In one embodiment of this invention, the flux concentrating lamination is in direct or indirect contact with one end face of the inner bearing ring of the bearing, while the outer part of the magnetic fluid seal is in direct or indirect contact with the end face of the outer bearing ring of the bearing. In another embodiment, the flux concentrating lamination on the inside is in direct or indirect contact with a radial reference shoulder of the shaft.

11 Claims, 6 Drawing Sheets

SPINDLE-DRIVE MOTOR WITH A MAGNETIC FLUID SEAL

BACKGROUND

1. Field of the Invention

This invention relates to a spindle-drive motor having a magnetic fluid seal comprised of precision bearing and lamination elements for proper positioning and sealing.

2. Discussion of Related Art

The use of such magnetic fluid seals in spindle-drive motors for use in hard drives is known. Their function is to seal the actual clean room, in which the storage medium, that is, the hard disk, rotates with respect to the bearing system of the driving motor. According to the related art, these magnetic seals consisting of a circular magnet and circular yoke laminations mounted on one or both sides are supplied in prefabricated form and installed in the motor, and only in one of the last steps of production are they filled with the magnetically conducting fluid supplied with them.

Because of the three-dimensional magnetic field which develops, the fluid introduced completely fills the concentric gap between the shaft and the magnetic seal. This results in a self-contained, largely homogeneous fluid ring which prevents any passage of particles and/or mass exchange between the bearing system and the clean room area of the drive.

Furthermore, it is known that an improvement in the magnetic fluid seal can be achieved by providing an additional flux concentrating lamination which overlaps radially with the yoke laminations between the two magnetic yoke laminations mounted concentrically on both sides of the magnet. The outside diameter of this disk-shaped flux concentrating lamination is smaller than the inside diameter of the disk-shaped ring magnet. The desired radial overlap is achieved due to the fact that the inside diameter of the magnetic yoke laminations is much smaller than the inside diameter of the ring magnet.

This magnetic field seal is also supplied in prefabricated form, with the flux concentrating lamination being permanently enclosed between the magnetic yoke laminations because of the radial overlap with the latter. This new magnetic fluid seal can be filled with the required amount of fluid at the time of fabrication due to the displacement of the fluid ring which provides the seal in the space between the two magnetic yoke laminations and the fact that the flux concentrating lamination is permanently enclosed. This eliminates a process step in final assembly of the motor which leads to lot of rejects.

In addition, the self-contained sealing fluid ring is additionally stabilized between the magnetic yoke laminations due to the centrifugal forces occurring due to rotation, so that leakage and escape of fluid into the clean room is practically impossible. Due to the radially overlapping arrangement of the flux concentrating lamination, the opposing faces of the flux concentrating lamination and the yoke laminations are maximized, but the distances are minimized. The two factors together yield a much lower volume resistance than in the related art when filled with a fluid that also conducts electricity.

However, a disadvantage of this known magnetic fluid seal is that it is very difficult to position this seal and its components accurately on the proper faces in the spindle-drive motor. Because of the low axial distance between the yoke laminations and the flux concentrating lamination, functionally proper positioning of the magnetic fluid seal in the spindle-drive motor is of central importance. This is true in particular of the axial positioning of the flux concentrating lamination between the yoke laminations. The flux concentrating lamination should be positioned as symmetrically as possible between the two yoke laminations, so that the unavoidable axial wobble between the parts rotating relative to one another does not result in contact.

SUMMARY OF THE INVENTION

Therefore, a primary purpose of this invention is to improve upon a spindle-drive motor having a magnetic fluid seal of the type described above so that the magnetic fluid seal can be introduced into a spindle-drive motor with a high precision and in cost-effective manner.

First, it should be pointed out that it is assumed for the sake of simplicity that the flux concentrating lamination is mounted on the stationary part of the motor, while the magnet disk and the respective yoke laminations are mounted on the rotating part. However, this invention also includes the kinematic inversion wherein the flux concentrating lamination is mounted on the rotating part and the magnet disk and the yoke laminations attached to the magnet disk are mounted on the stationary part.

Furthermore, this invention includes both spindle-drive motors having a stationary shaft as well as those having a rotating shaft, that is, a shaft connected to the rotor.

Nor should the number or position of magnetic fluid seals used in the spindle-drive motor be understood in a restrictive sense. It is possible to provide only a single seal or several seals may be provided. In the case when two seals are provided, for example, one may be arranged on the upper end of the shaft and the other on the lower end of the shaft. However, more than two seals may also be used.

An important feature of this invention is thus that the flux concentrating lamination (as the part on the inside radially) of the magnetic seal is positioned axially on faces of the spindle-drive motor that are machined to a high precision, and in a preferred embodiment according to this invention, such faces are the faces of the inner bearing ring of the bearing used. It does not matter here whether the face of the inner bearing ring of the bearing beneath it is in direct contact with the flux concentrating lamination of the magnetic seal, or whether there is also a spacer disk between them (indirect contact) which is also machined to a high precision and forms the connection and the support element between the flux concentrating lamination of the magnetic seal and the highly precision machined end face of the inner bearing ring of the bearing. In other words, this spacer disk may be omitted, and instead the flux concentrating lamination may rest directly on a face of the inner bearing ring. This inner bearing ring may be designed in the form of a shoulder which is extended axially upward with the flux concentrating lamination resting on it.

It has been found that reference faces on the shaft are essentially unsuitable—without special measures—because the shaft is subject to a high tolerance with regard to axial positioning faces in construction and installation. This means in particular that there is an unwanted axial height tolerance on the shaft, which is the sum of different individual tolerances in the axial direction of the shaft, so that ultimately the positioning of a magnetic fluid seal on a corresponding reference face of the shaft leads to an unacceptable installation tolerance - unless other additional measures are implemented (to be described below). Then a flux concentrating lamination centered on this shaft would no longer project centrally between the two rotating yoke laminations of the magnet disk and would not run centrally.

An important aspect of the present invention is providing that instead of this, faces of the inner bearing ring which can be machined to a high precision and can be positioned much more accurately in the axial direction in assembly are used for centering the flux concentrating lamination. In the installed state, this is a prestressed bearing (or several such bearings) where the displacement from the inside ring to the outside ring as a result of the prestress due to the precisely defined play between the rolling elements and the raceways can be calculated exactly and therefore can be predicted accurately. Thus the allocation of the two bearing rings is very precise and is subject to very little tolerance. If the outer part of the magnetic seal rests on the outer bearing ring, it is thus also possible to center the inner flux concentrating lamination with respect to the outer part of the magnetic seal by letting the flux concentrating lamination rest on the inner bearing ring. Thus, the allocation and axial positioning of the respective parts of the magnetic fluid seal are achieved through the inner and outer bearing rings. If the inner bearing ring is mounted on the shaft, for example, by gluing, at the start of assembly, this fixes the position of the inner ring relative to the shaft unambiguously.

With this invention a high precision system is proposed with the prestressed bearing elements of the bearing and the outer bearing ring, because according to this invention, the radially outer part of the magnetic fluid seal is positioned with a high precision on the outer bearing ring, while the flux concentrating lamination is also positioned with a high precision on the inner bearing ring. Thus, the invention consists essentially of the fact that the radially outer part of the magnetic fluid seal is positioned on the outer bearing ring while the radially inner part of the magnetic fluid seal is positioned on the inner bearing ring.

Direct positioning or indirect positioning can be accomplished by means of a spacer, a spacer disk, elongated parts of the inner and outer bearing rings which are inserted with a high precision.

In an embodiment of the present invention, the radially outer part of the magnetic fluid seal does not rest on the outer bearing ring but instead it rests on axial and radial faces of the rotor which are allocated accordingly (lift). Although an ideal allocation of the inner part of the magnetic fluid seal to the radially outer part is not achieved here, as described in the above mentioned embodiments, it may nevertheless be sufficient for various applications to use the face of the rotor, which is subject to a somewhat greater tolerance, for the radially outer part of the magnetic fluid seal.

In a third embodiment of this invention, a corresponding radial reference shoulder of the shaft may also be used as the seating face for the inner part of the magnetic fluid seal. It is assumed here that the inner bearing ring is in tight contact with the lower face of this radial shoulder of the shaft with no play, and likewise the radially inner part of the magnetic fluid seal (the flux concentrating lamination) rests on the upper face of this radial shoulder of the shaft without any play. This radially projecting ring shoulder then functions as a spacer in the axial direction. It thus serves as an axial spacer which, in this embodiment, is no longer connected to the inner bearing ring of the bearing, but instead is connected to the shaft itself.

Of course, the present invention is not limited to the fact that the outer part of the magnetic seal is in direct contact with a respective face of the outer bearing ring. Again in this case, a corresponding spacer disk, or some other spacer means that is machined to a high precision, may be provided between the outer bearing ring and the magnetic seal.

A preferred type of assembly according to this invention provides for the end face of the lower yoke lamination of the rotating part of the magnetic seal to be brought in contact with the outer ring of the bearing which is also rotating and to be secured axially in this position by means (for example, adhesive) which are essentially known. At the same time the flux concentrating lamination is kept at a distance axially from the inner ring of the bearing which has already been installed by means of a high precision spacer disk, thereby positioning the flux concentrating lamination almost exactly at the center between the two yoke laminations. This position is also secured permanently by essentially known means.

Another solution to this problem has an inside ring which is lengthened partially upward axially as part of the upper bearing on which the flux concentrating lamination is in contact and secured with an end face. The above-mentioned spacer disk is eliminated here and the occurrence of axial wobble is reduced due to the accuracy of the position of the bearing rings.

BRIEF DESCRIPTION OF THE DRAWING

The objects, advantages and features of the invention will be more clearly perceived from the following detailed description, when read in conjunction with the accompanying drawing, in which.

DETAILED DESCRIPTION OF THE PREFERRED EMBODIMENTS

When an upper magnetic seal is mentioned in the following description, this is not to be understood in a restrictive sense for the present invention. It is self-evident that a lower magnetic seal may also be provided accordingly, in which case the upper part would not be sealed. Likewise, two magnetic seals may also be provided. Similarly, a magnetic seal may also be paired with other known seals, for example, the magnetic seal in the upper part of the shaft of the spindle-drive motor according to FIG. 1, with a different type of seal being installed in the lower part of the shaft.

Figure 1:
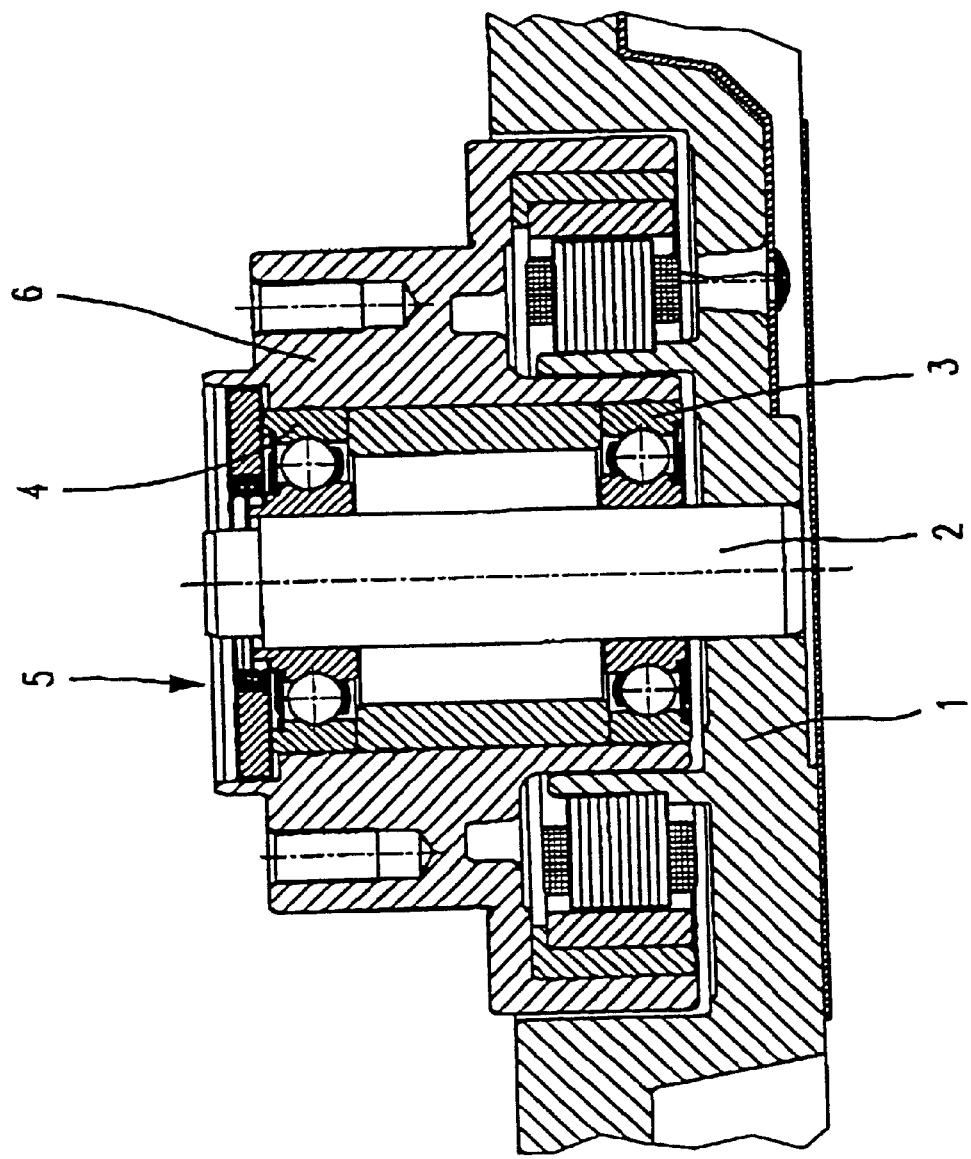
FIG. 1 is a cross sectional view through a spindle-drive motor having an upper magnetic seal and a stationary shaft and constructed in accordance with the invention.

The spindle-drive motor according to FIG. 1 consists essentially of stationary base plate 1 and shaft 2 fixedly connected to the base plate. Shaft 2 has lower bearing 3 and upper bearing 4. A rotor revolves on these two bearings and is equipped on its inner circumference with appropriate permanent magnets which are acted upon by an alternating electric field generated by a stator arranged on the base plate. Magnetic fluid seal 5 is arranged in the upper part of the rotor and is described in greater detail below.

Figure 2:
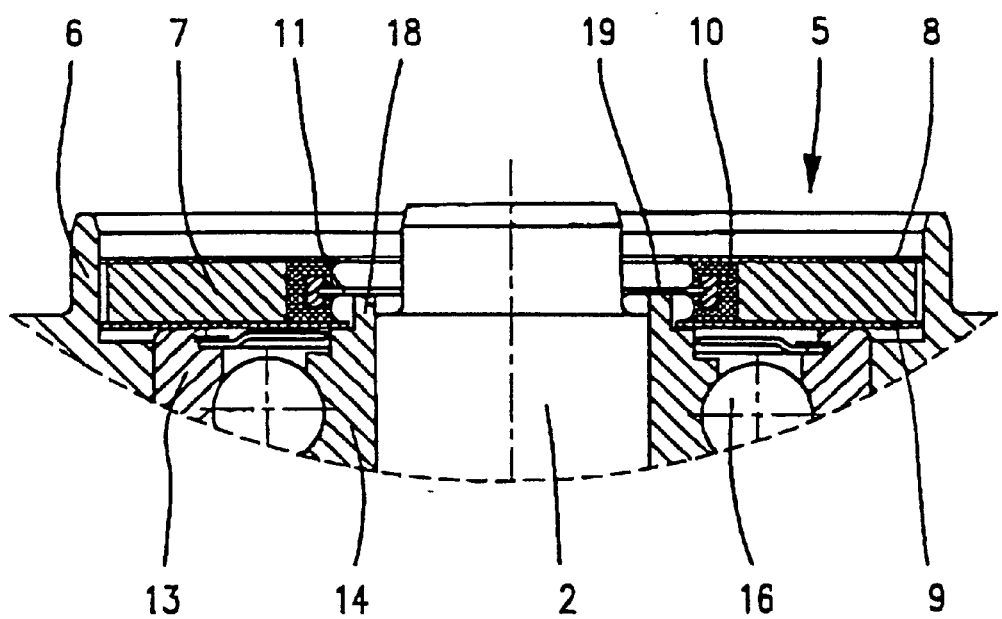
FIG. 2 is an enlarged partial sectional diagram of the magnetic fluid seal of the arrangement according to FIG. 1.

According to FIG. 2, upper bearing 4 consists of inner bearing ring 14 and outer bearing ring 13, with bearing elements 16 arranged between them. Any type and design of the bearing elements may be selected. Any desired types of bearings may be used, in particular spherical roller bearings or angular-contact bearings.

As indicated in the general description section above, there is a prestress between the inner and outer bearing rings over elements 16 and the corresponding raceways in bearing rings 13 and 14. This is because the raceways of bearing rings 13, 14 are axially offset relative to one another due to this prestress.

Magnetic fluid seal 5 prevents any exchange of particles or substance between the bearing system of bearings 3, 4 and the environment, that is, outer environment of rotor 6, as explained in the general description section. To this end, magnetic fluid seal 5 consists of magnet disk 7 which is a permanent magnet enclosed between yoke laminations 8 and 9. Yoke laminations 8, 9 are arranged in parallel and aligned with one another and extend radially inward beyond magnet disk 7. The space formed there is filled with magnetically conducting fluid 10. Flux concentrating lamination 11 directed radially inward is immersed in this fluid as centrally as possible in the middle between the yoke laminations. The flux concentrating lamination should be located centrally between yoke laminations 8 and 9 to guarantee proper functioning of the magnetic fluid seal.

For high precision axial positioning of flux concentrating lamination 11 in the intermediate space between yoke laminations 8 and 9, it is provided in the first embodiment according to this invention as illustrated in FIG. 2 that inner bearing ring 14 has shoulder 18 oriented axially upward, with contact faces 19 provided on it to support flux concentrating lamination 11. By this means this flux concentrating lamination is positioned with a high precision in the intermediate space between yoke laminations 8 and 9, because it rests only on inner bearing ring 14 of bearing 4, and this bearing ring is then positioned accurately with the outer part of the magnetic fluid seal, namely the yoke laminations and the magnet disk, by means of the prestress of bearing elements 16 and outer bearing ring 13.

Figure 3:
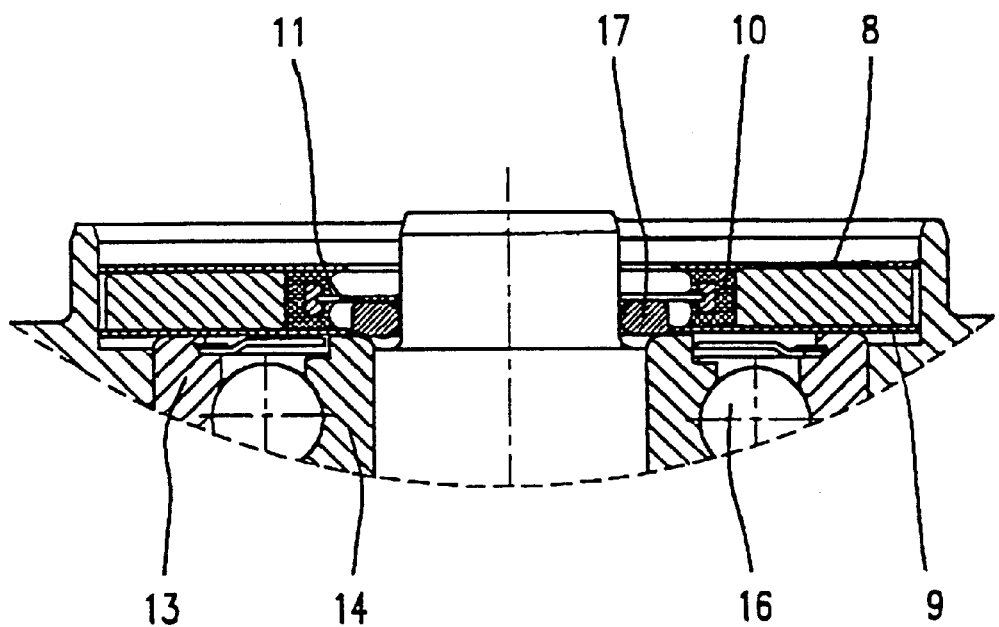
FIG. 3 is a modified embodiment in comparison with FIG. 2.

In a second embodiment according to this invention, shoulder 18 on inner bearing ring 14 may be eliminated according to FIG. 3, and instead of it, spacer ring 17 is used, which is machined to a high precision and supports flux concentrating lamination 11 while also resting on the face of the inner bearing ring, which is also machined to a high precision. Here again a central positioning of the flux concentrating lamination 11 between the yoke laminations of the magnetic fluid seal is achieved.

Figure 4:
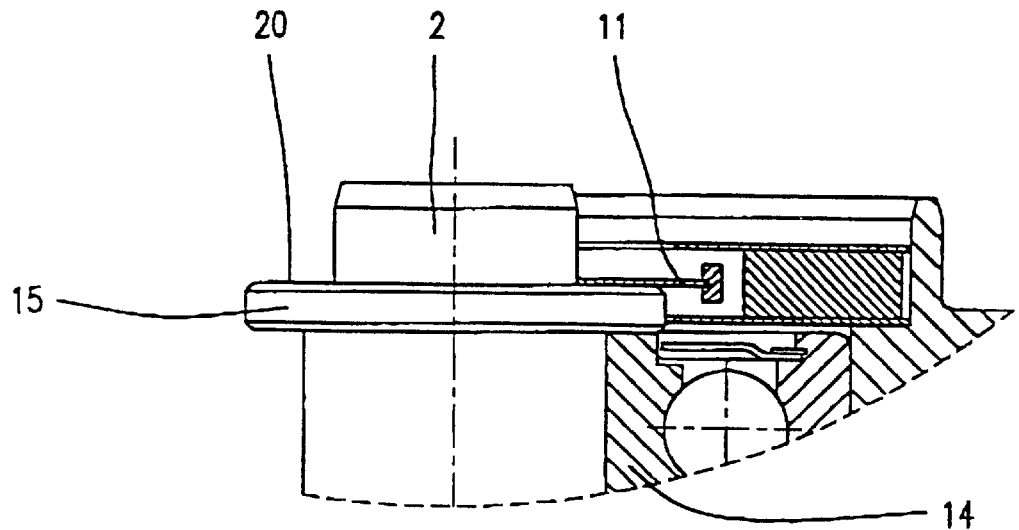
FIG. 4 shows a third embodiment in relation to FIG. 2.

In a third embodiment according to FIG. 4, the axial positioning of flux concentrating lamination 11 may be accomplished by means of contact face 20 of shoulder 15 projecting radially outward on shaft 2. Although it was mentioned in the general description introduction that there is a great total axial tolerance with respect to the shaft, this can, however, be avoided according to the present invention by using radial shoulder 15 of shaft 2 only as a spacer. Then flux concentrating lamination 11 rests on upper face 20 of shoulder 15 (which is machined to a high precision), while inner bearing ring 14 rests flush on the lower face of shoulder 15 without any play. Shoulder 15 then serves only as a spacer between inner bearing ring 14 and flux concentrating lamination 11 and thus replaces the above mentioned spacer ring 17 (or at least it serves the same purpose). Shoulder 15 is an integral part of stationary shaft 2 while the spacer ring is a separate part resting on the inner stationary bearing ring. The two solutions require a different type of assembly.

Figure 5:
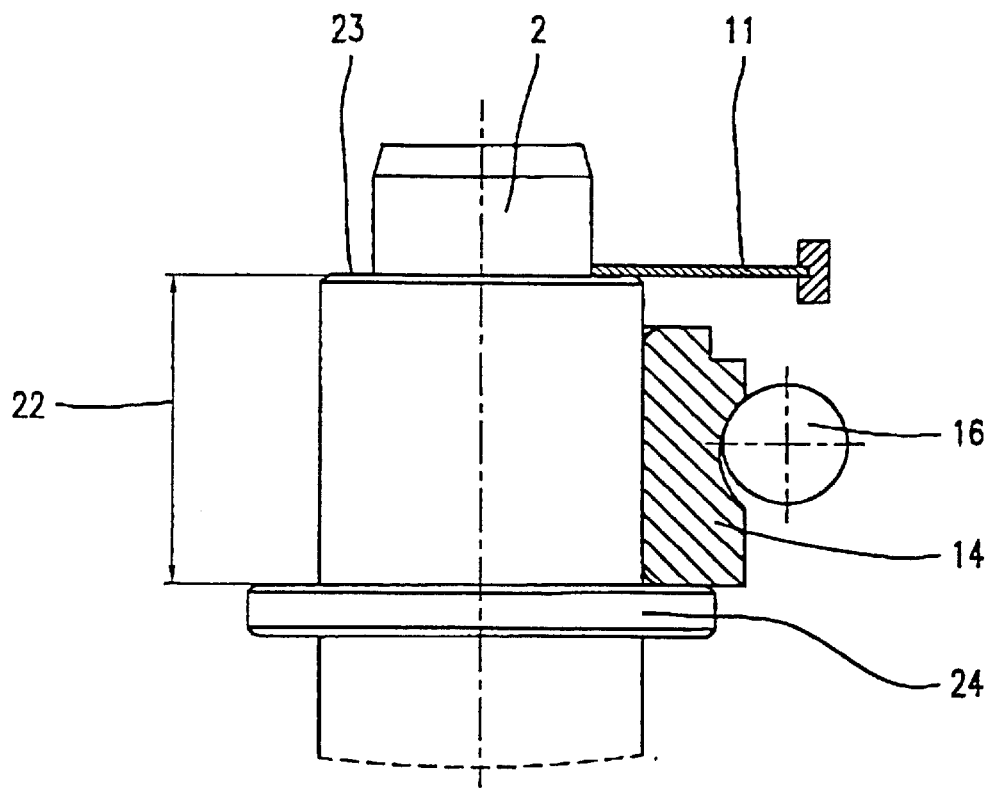
FIG. 5 depicts a fourth embodiment of the FIG. 2 structure.

FIG. 5 shows a modified embodiment in comparison with FIG. 4, where it can be seen that first flux concentrating lamination 11 is resting on radially outer shoulder 23 of shaft 2. Then bearing ring 14 can be installed at a precisely defined distance 22. Distance 22 is determined by the fact that the shaft is machined to a high precision, with another shoulder 24 being provided at a distance 22 on the shaft on which bearing ring 14 rests.

The distance between flux concentrating lamination 11, bearing ring 14 and the outer part of the magnetic fluid seal, which rests on the bearing ring and its bearing elements 16 and outer bearing ring 13, is adjusted by means of the arrangement of several shoulders 23 and 24. It has already been pointed out that it is not necessary for this invention to allow the outer parts of magnetic fluid seal 5 to rest directly on outer bearing ring 13.

Indirect solutions may also be considered. For example, a spacer ring having yoke laminations 8, 9 and magnet disk 7 can also be provided on the outer bearing ring.

In another embodiment, these parts of the magnetic fluid seal may rest on the corresponding reference faces and contact faces of rotor 6 instead of resting on outer bearing ring 13. However, this presupposes a precise allocation of positions between the rotor and the outer bearing ring of bearing 4.

Figure 6:
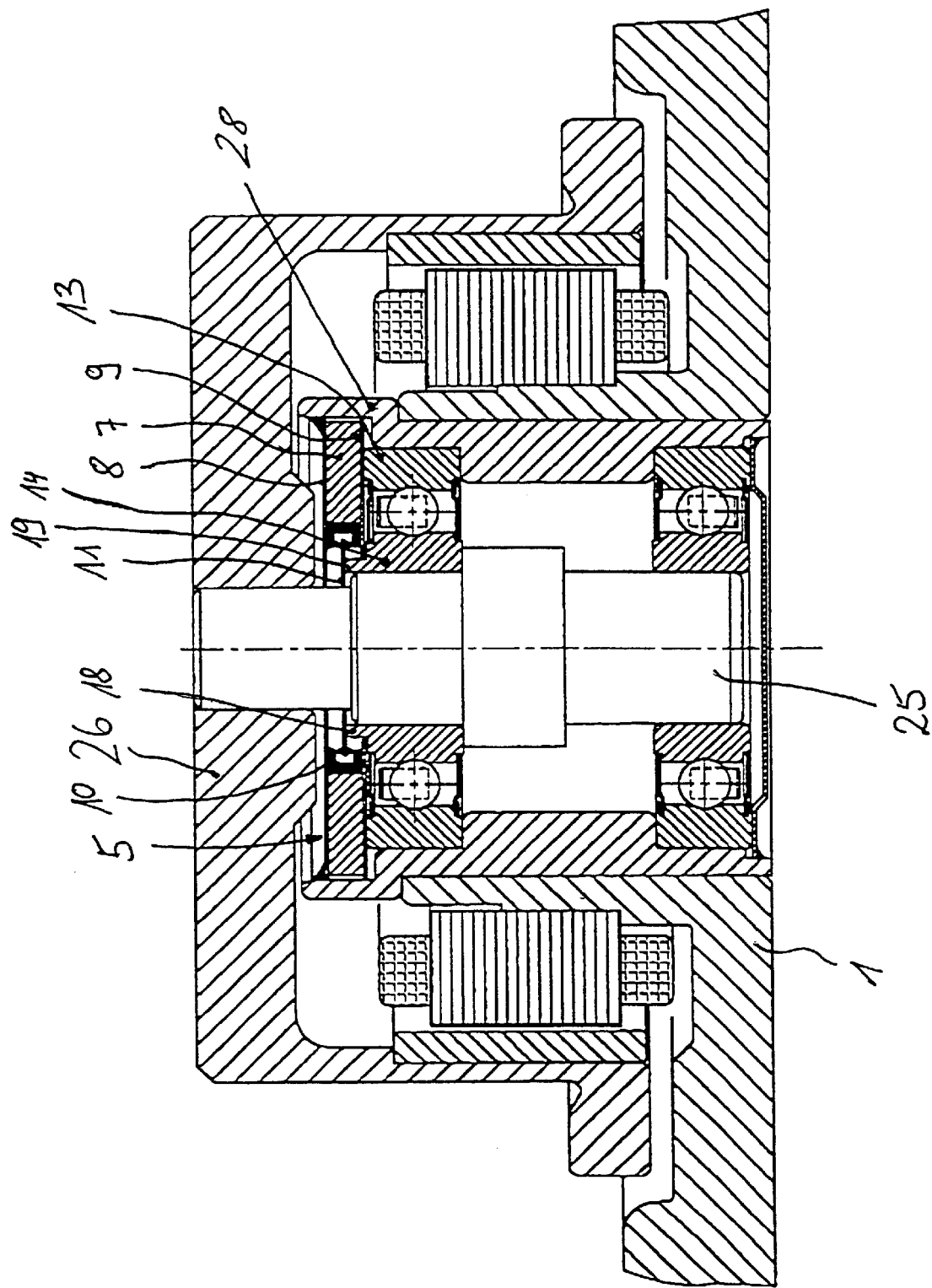
FIG. 6 is a cross sectional view of an embodiment of the spindle-drive motor with a rotating shaft and a magnetic fluid seal in accordance with the invention.
Figure 7:
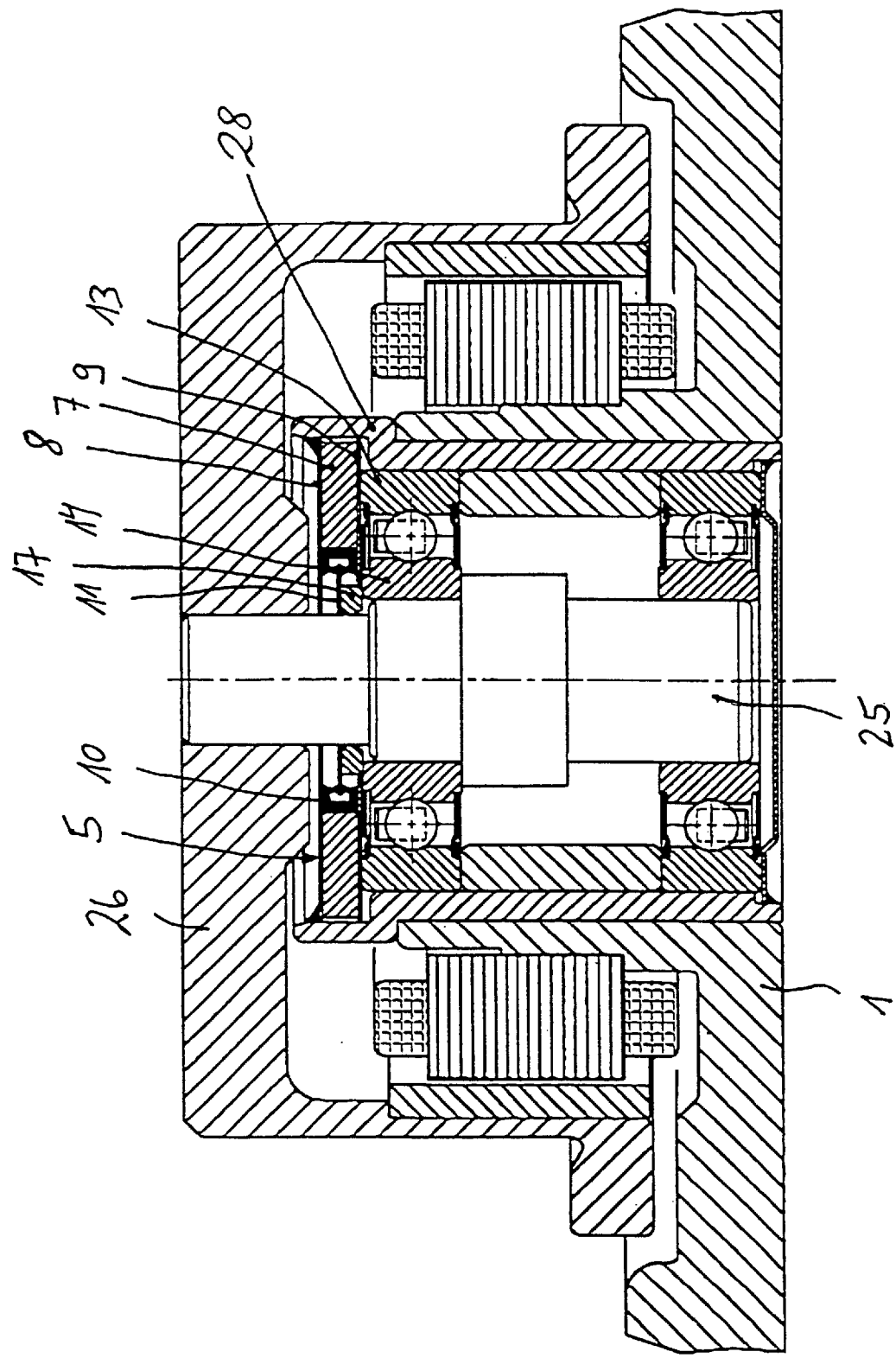
FIG. 7 is a cross sectional view of a second embodiment of the spindle-drive motor with a rotating shaft and a magnetic fluid seal in accordance with the invention.
Figure 8:
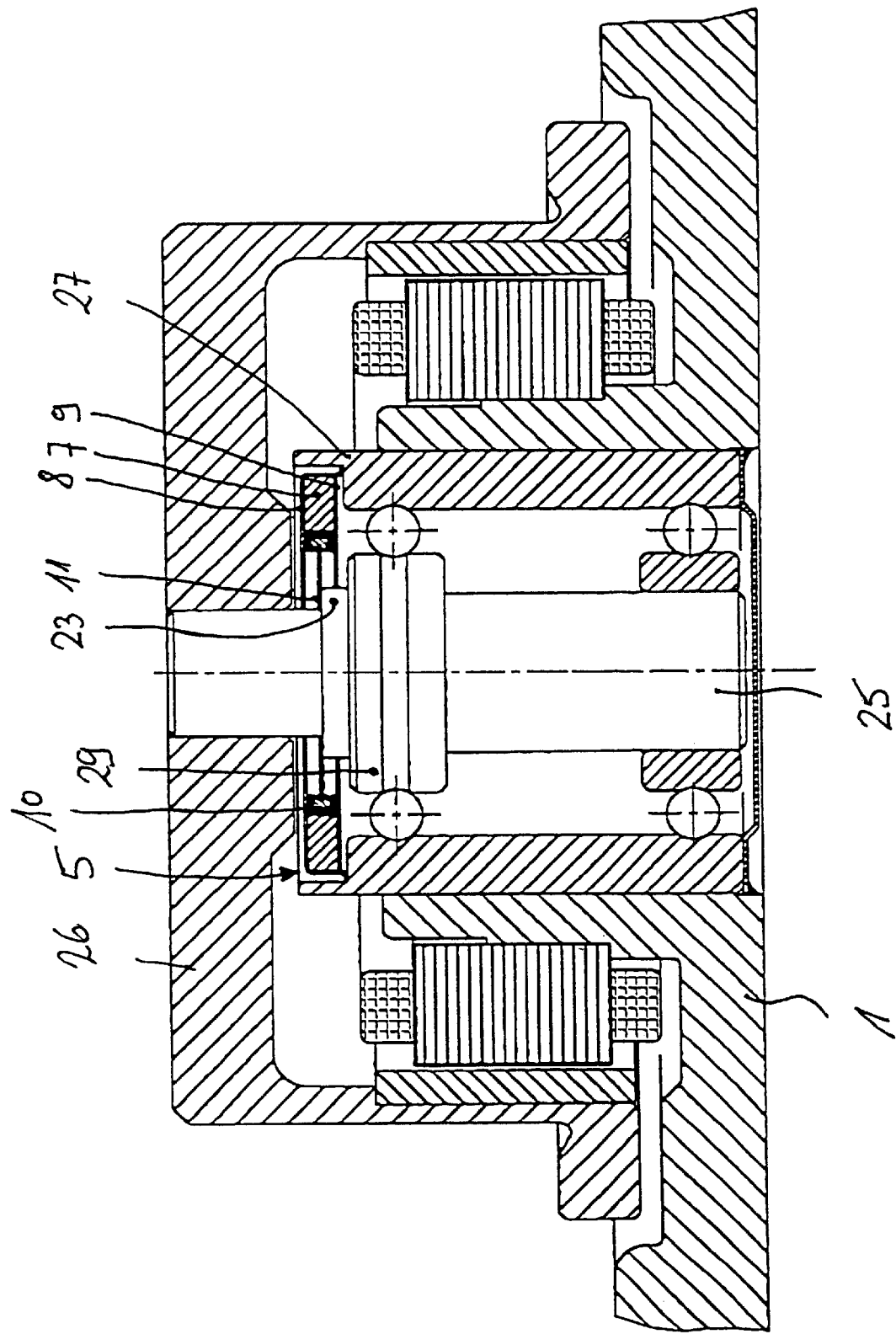
FIG. 8 is a cross sectional view of a third embodiment of the spindle-drive motor with a rotating shaft and a magnetic fluid seal in accordance with the invention.

FIGS. 6 through 8 illustrate embodiments of a spindle-drive motor having a rotating shaft and a magnetic fluid seal. With respect to FIGS. 1 through 5, the same parts are labeled with the same reference numbers. The basic design of the spindle-drive motors according to FIGS. 6 through 8 corresponds to that of the motors according to FIGS. 1 through 5.

In contrast with FIGS. 1 through 5, which show stationary shaft 2 connected to base plate 1, the spindle-drive motors according to FIGS. 6 through 8 have rotating shaft 25 which is fixedly connected to rotor 26. This means that inner bearing ring 14 of bearing 4, which is attached to shaft 25, rotates together with the shaft, while outer bearing ring 13 is fixedly connected to base plate 1 or intermediate sleeve 28.

For axial positioning of flux concentrating lamination 11 with a high precision in the intermediate space between yoke laminations 8 and 9, in the embodiment according to FIG. 6 inner bearing ring 14 is provided with shoulder 18 which is directed axially upward, with the flux concentrating lamination resting on end contact face 19. Therefore, this flux concentrating lamination is positioned with a high precision in the intermediate space between yoke laminations 8 and 9, because according to this invention it rests on shoulder 18 of inner bearing ring 14. The bearing ring is positioned accurately with respect to the outer part of the magnetic fluid seal, namely the yoke laminations and the magnet disk 7, by means of the prestress on bearing elements 16 and outer bearing ring 13.

In the embodiment according to FIG. 7, flux concentrating lamination 11 rests on spacer ring 17 which is machined to a high precision, and in turn rests on the upper end face of inner bearing ring 14. Here again, as described above, central positioning of the flux concentrating lamination between the yoke laminations of magnetic fluid seal 5 is achieved.

Another embodiment according to FIG. 8 provides for indirect positioning of flux concentrating lamination 11 on shoulder or step 23 of shaft 25 on which the flux concentrating lamination rests. Shoulder 23 is an integral part of the rotating shaft 25. Shaft 25 has collar 29 forming the inner bearing ring of upper bearing 4 at a precisely defined distance from the shoulder. Outer parts 7, 8, 9 of magnetic fluid seal 5 rest on outer bearing ring 27, and the outer bearing ring has the upper and lower bearings in common.

The nature of this invention is thus that it makes use of the properties of a bearing with an inner bearing ring, bearing elements between them, running under a prestress, and the outer bearing ring for centering the inner and outer parts of a magnetic fluid seal provided for the bearing ring. It is not necessary here for two bearings 3, 4 to be provided on the shaft with an axial distance between them. It is also possible to have only a single central bearing. Likewise, when there are two bearings spaced a distance apart, different pairings of bearings may also be used, such as bearing 4 with a fluid bearing, or a bearing 4 with a spherical roller bearing or the like.

What is claimed is:

1. A spindle-drive motor for hard drives having a baseplate, a shaft and one or more bearings for rotational mounting of a rotationally driven rotor, said motor comprising: at least one magnetic fluid seal arranged between the stationary part and the rotating part of said spindle-drive motor, said magnetic fluid seal comprising:

an outer part including one upper and one lower yoke lamination and a magnet disk between said yoke laminations being attached to one of the two parts of said spindle-drive motor that can rotate relative to one another, and where the inside of the magnet disk together with the inner areas of the yoke laminations forms a concentric chamber which is open toward the inside on one side to hold a magnetically conducting fluid;

a flux concentrating lamination projecting into the chamber and radially overlapping the yoke laminations;

said bearing comprising an inner bearing ring having an end face, said flux concentrating lamination being directly in contact with said end face;

said bearing comprising an outer bearing ring having an end face, and said magnetic fluid seal outer part being in direct contact with said end face of said outer bearing ring.

2. The spindle-drive motor according to claim 1, wherein the flux concentrating lamination rests on a lengthened ring shoulder of the inner bearing ring extending in the axial direction.

3. The spindle-drive motor according to claim 1, wherein the flux concentrating lamination rests on a spacer ring which in turn rests on the inner bearing ring.

4. The spindle-drive motor according to claim 1, wherein the radially outer part of the magnetic fluid seal does not rest on the outer bearing ring but instead rests on appropriately allocated axial and radial faces of the rotor.

5. A spindle-drive motor for hard drives with a base plate, a shaft and one or more bearings for rotational mounting of a rotationally driven rotor, said motor comprising: at least one magnetic fluid seal being arranged between the stationary part and the rotating part of said spindle-drive motor said magnetic fluid seal comprising:

an outer part including an upper and a lower yoke lamination and a magnet disk arranged between the yoke laminations being mounted on one of the two parts of said spindle-drive motor that can rotate relative to one another, and the inside of the magnet disk together with the inner areas of the yoke laminations forms a concentric chamber, which is open on one side toward the inside, to hold a magnetically conducting fluid;

a flux concentrating lamination overlapping the yoke laminations and radially projecting into said chamber;

said shaft being formed with a radial reference shoulder projecting radially outwardly from an outer surface of said shaft, said flux concentrating lamination on the inside being supported to an upper face of said radial reference shoulder;

said bearing having an outer bearing ring formed with an end face, said outer part of said magnetic fluid seal being in direct or indirect contact with said end face and said bearing having an inner bearing ring supported to a lower face of said radial reference shoulder.

6. The spindle-drive motor according to one of claims 1 through 5, wherein the outer rotating parts of the magnetic fluid seal are in contact with reference faces and contact faces of the rotor.

7. The spindle-drive motor according to one of claims 1 through 5, wherein the shaft is fixedly connected to the base plate.

8. The spindle-drive motor according to one of claims 1 through 5, wherein the shaft is a rotating shaft which is fixedly connected to the rotor.

9. A method of assembling a spindle-drive motor with a magnetic fluid seal according to one of claims 1 through 5, said method comprising:

bringing into contact with the outer bearing ring of the bearing the lower face of the lower yoke lamination of the magnetic fluid seal;

axially securing said lower face with respect to said outer bearing ring; and resting the flux concentrating lamination with a spacer ring on the inner bearing ring of the bearing which is already assembled and is secured permanently in this position.

10. A method of assembling a spindle-drive motor with a magnetic fluid seal according to one of claims 1 through 5, said method comprising:

bringing into contact with the outer bearing ring of the bearing the lower face of the lower yoke lamination of the magnetic fluid seal;

axially securing said lower face in position with respect to said outer bearing ring; and resting the flux concentrating lamination on an axial ring shoulder on the inner bearing ring of the bearing which is already assembled and is permanently secured in this position.

11. A method of assembling a spindle-drive motor with a magnetic fluid seal according to one of claims 1 through 5, said method comprising:

bringing into contact with the outer bearing ring of the bearing the lower face of the lower yoke lamination of the magnetic fluid seal;

axially securing said lower face in position with respect to said outer bearing ring; and resting the flux concentrating lamination on a radial shoulder of the shaft which is permanently secured in this position.

* * * * *